Dec. 27, 1960   S. T. WILLIAMS   2,966,191
TUBELESS TIRE VALVE STEM
Filed Aug. 10, 1954
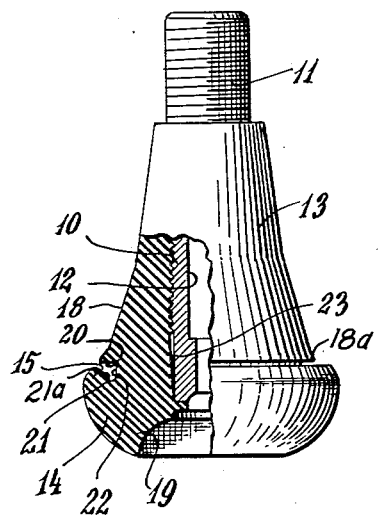
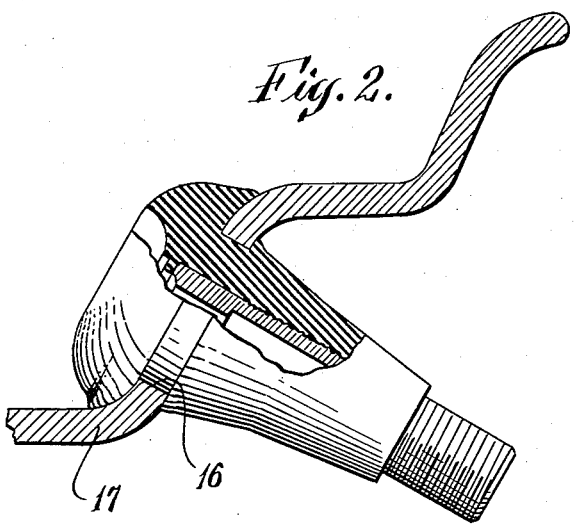
INVENTOR.
Selden T. Williams
BY
Churchill, Rich, Weymouth & Engel
ATTORNEYS

United States Patent Office 2,966,191
Patented Dec. 27, 1960

2,966,191

TUBELESS TIRE VALVE STEM

Selden T. Williams, Bellerose, N.Y., assignor to Scovill Manufacturing Company, Waterbury, Conn., a corporation of Connecticut Filed Aug. 10, 1954, Ser. No. 448,858

6 Claims. (Cl. 152—427)

The present invention relates to valve stems for tubeless pneumatic tires and aims to provide certain improvements therein. More particularly, it relates to valve stems of the snap-in type which, when inserted through a valve stem hole in a wheel rim, will snap into position to lock the valve stem on the rim.

In the development of the snap-in type of valve stem for tubeless tires some difficulty has been experienced in securing absolute fluid-tight sealing of the rubber of the valve stem with the rim at, and around, the valve stem hole at low temperatures. By making the valve stem housing of a special neoprene compound, resistance against leakage under motion and vibration was achieved down to approximately 25° F. below zero. However, at still lower temperatures a completely satisfactory solution to the problem of securing absolute sealing may not be found in improving the composition of the elastomeric housing. Hence, other means have been sought for insuring perfect sealing between the valve stem housing and the rim under all conditions.

It is accordingly the primary object of the present invention to provide a snap-in type of valve stem for tubeless tires which will insure absolute sealing against air leakage from the tire around the valve stem hole in the rim.

A further object of the invention is to provide a valve stem, as recited in the primary object, which can be quickly mounted on a rim, either manually or with the aid of a suitable tool.

The foregoing and other objects of the invention, not specifically enumerated, are accomplished in one or a combination of the following ways: (1) by having the lower portion of the elastomeric housing, particularly in the region where the valve stem extends through the rim, unbonded to the metal valve insert, whereby the housing may be stretched or tensioned to reduce its diameter and facilitate its passage through the rim hole; and (2) by spacing the flanges or other peripheral means of the housing which engage the faces of the rim, where flanges or such means are employed, as closely together as practicable to obtain the maximum clamping and sealing effect of said flanges or other means with the rim at the valve stem hole therein.

The invention in its various aspects and applications will be more fully understood from the detailed description which follows, when considered in connection with the accompanying drawings, wherein:

Figure 1 shows in side elevation, partly broken away, a snap-in valve stem according to one embodiment of the invention.

Fig. 2 shows in elevation, partly broken away, the valve stem of Fig. 1 mounted on a wheel rim, which is shown in radial section.

Referring to the drawings, the valve steam comprises a tubular metal insert 10 formed with a conventional, externally threaded nipple 11 and an internal chamber 12 adapted to accommodate a standard, replaceable valve insides or core (not shown), and bonded, at least in part, in coaxially encompassing relation with said metal insert is a housing 13 of elastomeric material having an enlarged, mushroom-like, deformable clamping base 14 and portions 22 and 18a of smaller external diameters than the base 14 but of somewhat larger diameters than a hole 16 in a rim 17 upon which the valve stem is adapted to be mounted. The housing tapers generally from the portion 18a toward the nipple 11, as shown at 18 and for a portion of its length has a diameter to pass freely through said rim hole 16. The portion 18a in effect constitutes a peripheral rib or bead. The portion 22 forms with the top 21 of the base 14 and with the underside 20 of the portion 18a an annular groove 15. The base 14 at its top 21 terminates at its free edge in an annular axially extending peripheral flange 21a and the walls of said groove and said flange are so related that when the valve stem is forced or drawn through the hole 16 in the wheel rim 17, the walls of the groove and the flange will snugly engage the rim at said opening to securely hold the valve stem onto the rim with a fluid-tight fit.

The elastomeric housing 13 extends beyond the lower region of the tubular metal insert 10 and is formed in its bottom with an enlarged axial recess 19 communicating with the bore of the insert. The annular groove 15 may be of any desired shape in radial cross-section and its opposed walls 20, 21 approach each other as they extend outwardly from the portion 22.

The valve stem may be readily mounted on a wheel rim prior to mounting the tire thereon by inserting the nipple end of the stem through the hole 16 in the rim from the tire face thereof, whereupon the tapered portion of the housing of smaller diameter than the rim hole will pass therethrough. The tapered portion of the valve stem of larger diameter than the rim hole must then be forced or drawn through the rim hole, the material of the housing being preferably first coated with a suitable lubricant, such as soapy water. To facilitate such insertion, however, the housing, which prior to the present invention has been bonded to the insert throughout the area of engagement therebetween, is left unbonded to the inner end portion of the insert 10 in the region of the annular groove 15, as shown at 23, preferably for a length extending beyond the axial dimensional limits of said groove. By virtue of said unbonded region, the housing may be stretched or tensioned to reduce its diameter in the region of the groove, in the course of pushing or pulling the valve stem through the rim hole. To separate the moulded material of the housing and the valve stem at the region aforementioned, the valve stem may be coated locally with a suitable lacquer prior to vulcanization, or other means provided to assure the separation at said region. It will thus be apparent that after the portion of the valve stem above the mushroom base has been tensioned and drawn through the wheel rim hole so as to be visible at the opposite side of the rim from that engaged by the base and the tension then relieved, the elastomeric housing will tend to resume its original form and thus provide clamping force against the rim at the hole therein and at the rim surfaces surrounding said hole.

From a consideration of the valve stem construction hereinbefore described and the relative dimensions of the parts thereof, it will be appreciated that, when the valve stem is snapped into place through the hole in the rim, the hole will be completely filled by the portion 22 of the housing of reduced diameter above the enlarged base and the portions of the housing adjacent to the wall of reduced diameter which fills the rim hole will securely engage the opposite faces of the rim.

While there has been shown and described a preferred embodiment of the invention, it is to be understood that the invention is not to be considered as limited to the precise details of construction disclosed, since changes may be made therein within the scope of mechanical and engineering skill without departing from the invention as claimed.

What I claim is:

1. A snap-in valve stem adapted for mounting in a valve stem hole in a wheel rim for a tubeless tire, said valve stem comprising a non-deformable tubular insert adapted to accommodate a valve insides or core and an elastomeric housing coaxially encompassing and bonded to the insert; said housing having an axial part of the encompassing portion unbonded to the insert, an enlarged base, a portion of reduced diameter adjacent the top of the base and of larger diameter than the valve stem hole in the rim, an outer end portion which is generally tapered outwardly from its outer end with a part of its length being of a diameter to pass freely through said valve stem hole, and its inner end being of larger diameter than the valve stem hole; said insert extending into the housing portion of reduced diameter and being unbonded to said encompassing housing portion in the region where the housing passes through the rim hole when mounted on a wheel rim, and said housing at said unbonded portion being capable of axial tensioning or stretching in relation to the bonded portion to reduce the external diameter of the unbonded portion, whereby when the valve stem is inserted into the rim hole and the tapered portion of the housing engages the wall of said hole and a tensioning force is applied to said unbonded portion in a direction to cause said unbonded portion to enter the hole, said unbonded portion will have its diameter reduced and enter the hole for an axial distance to bring the top of the base into abutting engagement with a face of the rim, and upon withdrawing the tensioning force, the unbonded portion of the housing will, due to the contractile force tending to return to its normal diameter, lock the valve stem onto the rim within and around the hole therein to provide a fluid-tight seal therewith.

2. A snap-in valve stem according to claim 1 wherein the encompassing portion of the housing that is unbonded to the insert extends to within the axial dimensional limits of the housing portion of reduced diameter.

3. A snap-in valve stem according to claim 1 wherein the housing is formed with a peripheral groove, the bottom wall of which groove forms part of said portion of the housing of reduced diameter and one side wall of the groove is formed by the top of the base, and wherein the portion of the housing that is unbonded to the insert extends to within the axial dimensional limits of the bottom wall of the peripheral groove.

4. A snap-in valve stem according to claim 1 wherein there are adjacent portions of reduced diameter in proximity to the top of the enlarged base, one of said portions providing a peripheral bead spaced axially from the top of the base a distance such that in the course of mounting the valve stem on a rim by the application of tension to the unbonded portion of the housing, when the top of the base abuts the tire side of the rim, the emergence of the peripheral bead through the rim hole will serve as a telltale indicating that the applied tension or stretching force may be withdrawn.

5. A snap-in valve stem according to claim 1 wherein the top of the enlarged base is formed with an annular flange axially extending toward the outer end portion of the valve stem.

6. A snap-in valve stem according to claim 1 wherein the base of the housing is formed in its bottom with an enlarged axial recess to enable the elastomeric material of the base to better conform to the contour of the rim around the valve stem hole therein.

References Cited in the file of this patent

UNITED STATES PATENTS

| | | |
|---|---|---|
| 1,297,113 | Domenico | Mar. 11, 1919 |
| 2,049,252 | Eberhard | July 28, 1936 |
| 2,054,965 | Clo | Sept. 22, 1936 |
| 2,192,572 | Bourdon | Mar. 5, 1940 |
| 2,272,886 | Wilson | Feb. 10, 1942 |
| 2,277,885 | Rodanet | Mar. 31, 1942 |
| 2,634,785 | Tubbs | Apr. 14, 1953 |
| 2,769,476 | Herzegh et al. | Nov. 6, 1956 |
| 2,798,530 | Nonnamaker | July 9, 1957 |

UNITED STATES PATENT OFFICE
CERTIFICATION OF CORRECTION

Patent No. 2,966,191                      December 27, 1960

Selden T. Williams

It is hereby certified that error appears in the above numbered patent requiring correction and that the said Letters Patent should read as corrected below.

Column 3, line 36, after "return" insert -- it --.

Signed and sealed this 23rd day of May 1961.

(SEAL)
Attest:

ERNEST W. SWIDER                      DAVID L. LADD
Attesting Officer                      Commissioner of Patents